April 16, 1929. A. H. SHOEMAKER 1,709,494
PNEUMATIC BUMPER
Filed May 29, 1928

INVENTOR
Alvin H. Shoemaker
BY
Fred C. Matheny
ATTORNEY

Patented Apr. 16, 1929.

1,709,494

UNITED STATES PATENT OFFICE.

ALVIN H. SHOEMAKER, OF SEATTLE, WASHINGTON.

PNEUMATIC BUMPER.

Application filed May 29, 1928. Serial No. 281,440.

My invention relates to improvements in pneumatic bumpers for use on motor vehicles and the general object of my invention is to provide a pneumatic bumper of simple, strong and durable construction that may be used on a motor vehicle to protect the vehicle in case of collision.

A more specific object is to provide a bumper formed of two parallel tubes disposed side by side and arranged in such a manner as to mutually help support each other.

Further specific objects are to provide a pneumatic bumper in which the pneumatic tubes are encased in a canvas bag; to provide a bumper in which the pneumatic tubes rest against and are supported by, flat spring members and to provide novel and efficient means for securing the bumper member to the spring supports.

Other specific objects will be apparent from the following description taken in connection with the accompanying drawings.

In the construction of motor vehicle bumpers it is desirable to have the bumpers of substantial width from top to bottom to more adequately protect the car from collision. For this reason many of the spring metal bumpers are made with two or more springs or flat metal bars arranged one above another. In a pneumatic bumper if only one cushion tube is employed it is impossible to make a bumper having a relatively great width from top to bottom without using a tube so large as to be hard to support and to appear cumbersome and awkward. This is practically prohibitive in connection with pleasure cars where beauty is very much desired. I find that by using two or more tubes arranged one above another and supported in such a manner that they will expand against each other I am able to make a pneumatic bumper of substantially any desired width from top to bottom and of a limited thickness from front to rear. I have illustrated the invention as embodied in a double tube bumper but it will be understood that more than two tubes may be used in substantially the same manner if desired.

In the drawings Figure 1 is a plan view looking down on the top edge of a bumper constructed in accordance with my invention.

Like reference numerals designate like parts throughout the several views.

Figure 1:
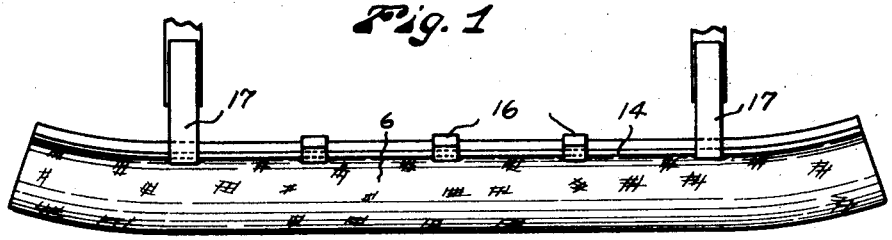
Figure 2:
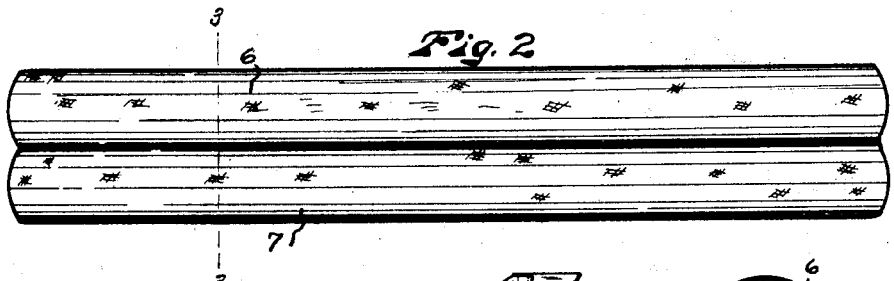
Fig. 2 is a front elevation of the same.

Referring to the drawings, I show a double tube pneumatic bumper formed of two parallel cushion tubes disposed side by side in parallel relation and resting against each other. Said cushion tubes are formed of external casings 6 and 7, preferably of canvas, within which are disposed elastic tubes 8 and 9 of rubber which may be inflated through valves 10.

Figure 3:
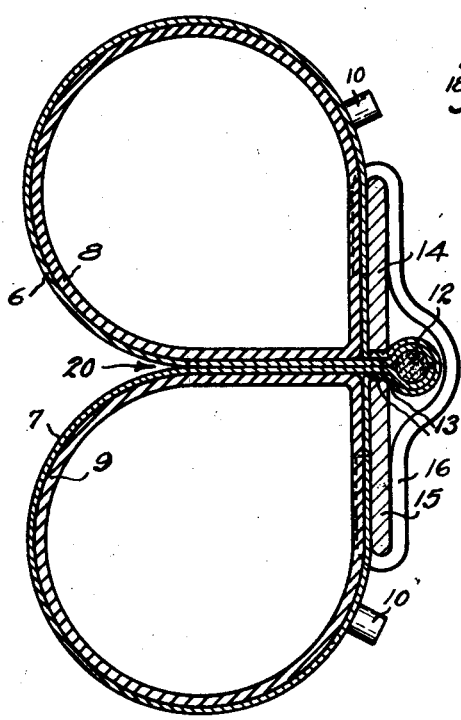
Fig. 3 is a sectional view on a larger scale on broken line 3—3 of Fig. 2.

The canvas tubes 6 and 7 are preferably formed of a flat piece of canvas 11 having its two edges folded inwardly and drawn around a rope 12 and stitched or sewed as at 13 to form two tubular compartments of equal size for the reception of the rubber tubes 8 and 9. It will be noted that the loose edges of the canvas are folded on the inside adjacent the rope 12 as shown in Fig. 3.

14 and 15 are two relatively long flat steel springs which serve as backing members and supports for the two cushion tubes. The springs 14 and 15 are secured together as shown in Fig. 3 by a plurality of clips 16 which have hook portions at both ends and may be slipped over the springs from either end of said springs.

Brackets 17 may be connected with the springs 14 and 15 for securing the bumper to a motor vehicle.

The springs may be straight or curved depending upon what shape it is desired to give the bumper.

Figure 4:
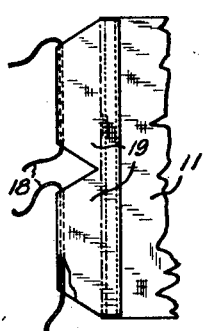
Fig. 4 is a fragmentary view showing the manner of applying the end closure draw string means.
Figure 5:
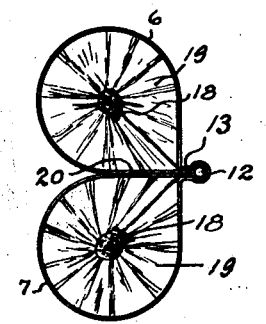
Fig. 5 is an end view showing the draw string end closure means as it may appear after inflation of the tubes.

In assembling the bumper the rubber tubes 8 and 9 are inserted into the canvas tubes 6 and 7 from the ends and draw strings 18 in the ends 19 of the canvas tubes are drawn tight and tied. Either before or after the tubes 8 and 9 are inserted, the springs 14 and 15 are applied so that the portion 13 of the canvas adjacent the rope 12 is caught between the two edges of said springs and the clips 16 are slipped over said springs, clamping the springs together on the canvas with the rope 11 on the rear side of said springs and the cushion tubes on the front side. The brackets 17 may be applied at the same time as the clips 16, thus making the bumper ready to be secured to a motor vehicle. After the clips 16 and brackets 17 have been applied the tubes 8 and 9 may be inflated, causing them to assume the positions shown in Fig. 3, with the adjacent parts of the two canvas tubes forced tightly against each other at 20, and with the canvas tubes held tightly against the springs 14 and 15. When the tubes are thus inflated they will tend to support each other and to force each other back firmly against the springs 14 and 15 thus making a very substantial bumper which is very resilient and which affords maximum protection to the vehicle on which it is installed. The inflation of the tubes brings pressure on the springs 14 and 15 and clips 16 and prevents all rattling noises. The air pressure within the tubes 6 and 7 may be relatively low as compared to that ordinarily carried in pneumatic tires. The ends 19 of the canvas bags being closed by draw strings makes the tubes 6 and 7 readily accessible. Said ends 19 may be pieces of flexible fabric doubled and sewed to the canvas as shown in Fig. 4. Other methods may be devised for closing the ends of the canvas tubes.

By the double tube construction just described I am able to provide a bumper having the combined width of two tubes from top to bottom and the width of one tube from front to rear.

It will be obvious that more than two tubes may be used in building up a bumper of this class if greater width from top to bottom is required.

Figure 6:
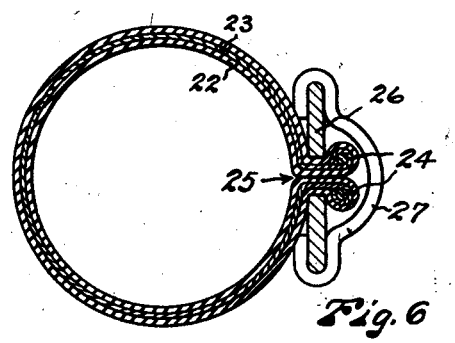
Fig. 6 is a sectional view of a single tube bumper constructed in accordance with my invention.

In Fig. 6 I have shown a single tube bumper constructed in accordance with my invention and suitable for use where only small bumpers are required. In this figure I provide a single casing 22 which may be made flat with cords 23 embedded therein and running back and forth across the tube member and drawn around cables 24 at the edges. After the flat member is constructed it may be doubled and sealed at 25 adjacent the two edges as by vulcanizing and the sealed portion may be clamped between two spring members 26, which are held by clamps 27. This makes a simple and practical construction for small bumpers and the tube 22 is very cheaply manufactured due to the fact that it may be moulded flat.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. A bumper embodying a casing having a pneumatic chamber therein, a projecting corded portion extending along one side of said casing and parallel supporting members arranged to clamp the casing between the pneumatic chamber and the corded portion and serving as a backing for the pneumatic chamber.

2. A bumper embodying a pneumatic casing, a longitudinally extended corded portion projecting from one side of said casing, parallel supporting springs disposed with their flat sides against the back of the casing and clamping between their edges the casing adjacent the corded portion and clamp means securing said flat springs together.

3. A pneumatic bumper embodying supporting means, and a plurality of pneumatic tubes secured to said supporting means and arranged to be forced against each other and against the supporting means by internal air pressure.

4. A pneumatic bumper, embodying supporting means and two pneumatic tubes secured to said supporting means and arranged to be flattened against each other and against the supporting means by the pressure of air within said tubes when the tubes are inflated.

5. A pneumatic bumper, embodying relatively flat supporting means and two pneumatic tubes secured to said supporting means along a common line extending longitudinally of the tubes and the supporting means.

6. A pneumatic bumper, embodying two flat supporting springs, two pneumatic bumper tubes resting against the front sides of said springs and connecting means secured to the two pneumatic tubes and extending between said two springs for securing the tubes to the springs.

7. A pneumatic bumper embodying tubular bumper members, securing means extending lengthwise of said bumper members and spaced apart supports arranged to receive therebetween the securing means of said bumper members, whereby inflation of said bumper members will crowd said bumper members against said supports and against each other.

8. A pneumatic bumper embodying two tubular bumper members, securing means extending lengthwise along said bumper members and two flat springs disposed in edge to edge relation and arranged to clamp therebetween said securing means.

9. A pneumatic bumper embodying a non-elastic casing having two tubular receptacles formed therein, a longitudinally extending securing member formed on the casing between the two receptacles, a support arranged to engage and hold said securing member throughout the length of said casing and pneumatic tubes in the respective receptacles said casing being arranged to rest against said support when the tubes are inflated.

10. The apparatus as claimed in claim 9 in which draw string means are provided for closing the ends of said tubular receptacles.

11. A pneumatic bumper embodying a non-elastic casing having two tubular receptacles formed therein, a longitudinal extending securing member formed on the casing between said receptacles, a cord extending lengthwise of said securing member, two flat supporting springs arranged to have said securing member held therebetween with said tubular receptacles on one side and said cord on the opposite side of said springs, clamp means for securing said springs together and pneumatic tubes in said tubular receptacles.

The foregoing specification signed at Seattle, Wash., this 21st day of May 1928.

ALVIN H. SHOEMAKER.